E. A. KOSCHINSKI.
COUPLING.
APPLICATION FILED JUNE 8, 1909.
944,877.
Patented Dec. 28, 1909.
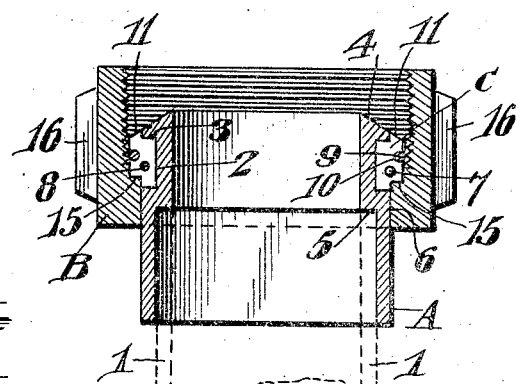
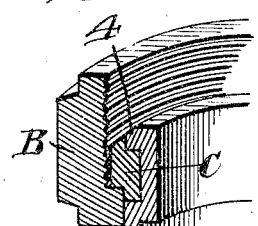
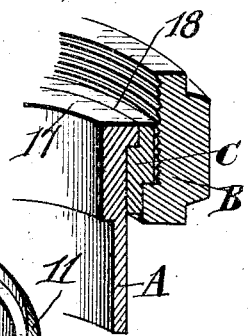
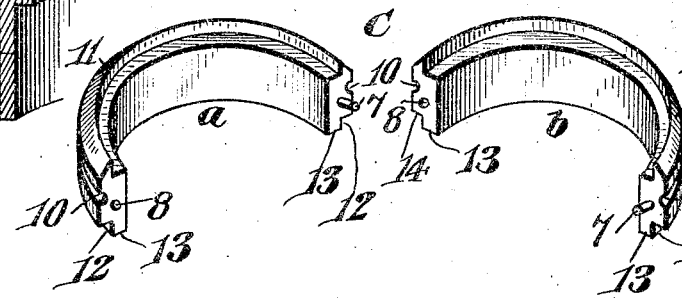
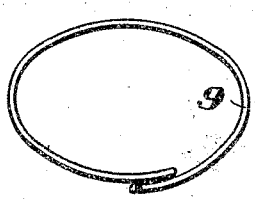
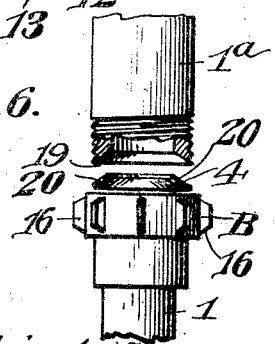
Ernest A. Koschinski, Inventor

UNITED STATES PATENT OFFICE.

ERNEST AUGUST KOSCHINSKI, OF SCRANTON, PENNSYLVANIA.

COUPLING.

944,877. Specification of Letters Patent. Patented Dec. 28, 1909.

Application filed June 8, 1909. Serial No. 500,802.

*To all whom it may concern:*

Be it known that I, ERNEST AUGUST KOSCHINSKI, a citizen of the United States, residing at Scranton, in the county of Lackawanna and State of Pennsylvania, have invented a new and useful Coupling, of which the following is a specification.

This invention relates to a coupling especially designed for use in connection with copper pipes and the like employed in locomotive injectors, air pumps and other appliances. In this class of devices, it is the common practice to braze the thimble or coupling sleeve on the copper pipe so that when the threads of the coupling nut become worn out or otherwise injured, necessitating replacing, the pipe to which the thimble is connected requires to be removed and the pipe, thimble and nut placed in a fire for burning off the thimble to detach the nut, the nut and thimble being then replaced by new ones, since the burning destroys the original thimble and nut.

The present invention has for its object to provide a novel coupling device so designed as to avoid the objections above noted and at the same time insure a fluid-tight joint, and one which can be readily taken apart for repair or other purposes.

In the accompanying drawing, which illustrates one embodiment of the invention, Figure 1 is a central vertical section of the coupling. Fig. 2 is a perspective view of the two parts of the nut-retaining ring, the parts being shown disconnected. Fig. 3 is a perspective view of the spring band for holding the parts of the ring. Figs. 4 and 5 are fragmentary sectional views of modified forms of the device. Fig. 6 is a side elevation on a reduced scale of a coupling preparatory to connecting two pipes together.

Similar reference characters are employed to designate corresponding parts throughout the views.

Referring to the drawing, A designates the thimble of the coupling which is brazed or otherwise suitably secured to a fluid-conducting pipe 1, shown by dotted lines, and encircling this thimble is a clamping nut B for coupling an injector, air pump, pipe section or the like to the fluid-conducting pipe 1. The thimble or sleeve 1 is provided with an annular groove 2 adjacent its extremity to provide spaced shoulders 3, and immediately above the groove, the end of the thimble is formed into a frusto-conical seat 4 which is adapted to be engaged by a correspondingly-shaped part of the appliance to which the pipe 1 is to be connected. The opposite end of the thimble is enlarged internally in diameter to receive the pipe 1 which bears against the internal annular shoulder 5. The nut B engages a retaining ring C that is confined in the groove 2 and projects out of the latter to form an abutment 15 against which the internal annular flange 6 of the nut engages. The ring C is made in two parts $a$ and $b$, Fig. 2, for facilitating assembling and disassembling of the coupling, the parts being semi-circular and their meeting edges carefully finished so as to provide tight joints. The parts of the ring are secured together by dowel pins 7, one end of each section entering sockets 8 in the corresponding end of the other section. If desired, a spring band or split annulus 9 encompasses the ring C to assist in holding the parts together, the said band being disposed in an external annular groove 10 of the ring C. The axial dimension of the ring is such as to fit between the two shoulders 3 of the thimble, and extending beyond one end of the ring is a marginal flange 11 which embraces the thimble immediately below the seat 4, and the top surface of the flange 11 is beveled at the same angle as the seat to form a continuation of the latter. The end face of the ring C opposite from the beveled seat portion thereof is provided with an external marginal recess 12 whereby an extension 13 is formed which enters the portion of the nut of smaller diameter and engages the flange 6 of the nut. The recess 12 provides a shoulder 14 with which the shoulder 15 of the flange 6 engages. The portion of the nut of larger diameter is threaded for connection with the appliance intended to be joined with the fluid-conducting pipe 1, the nut having external lugs 16 for accommodating a wrench or spanner to facilitate the screwing and unscrewing of the nut.

In practice, when it is desired to connect an appliance with the pipe 1, the nut A is first passed over the thimble and moved backwardly on the pipe 1 to expose the groove 2 of the thimble in which the parts of the ring C are fitted and secured, care being exercised to place the ring so that its upper external flange 11 will be uppermost to be flush with the seat 4 of the thimble. The appliance to be coupled is then brought into coöperative relation with the seat 4, and the nut B is next moved outwardly over the thimble for screwing on the said appliance, the retaining ring forming an abutment against which the nut is screwed home when the parts of the coupling are tightened. To detach the nut for renewal or other purposes, it is merely necessary to unscrew and move the same backwardly off the thimble to permit the retaining ring C to be detached, whereupon the nut can be withdrawn over the thimble.

In the modified form shown in Fig. 4, the ring and thimble are constructed substantially the same as the said parts in Fig. 1, except that the external groove 10 of the ring C and the spring 9 are dispensed with. In Fig. 5, the thimble A is formed with a flat seat 17 and the upper end of the extension 11 is formed with a flat face 18 that is flush with the seat 17. The pipe section 1ª, Fig. 6, on which the nut B screws, has its lower end formed into a seat 19 which is conical to engage the seat formed by the conical surfaces 4 and 11 when the coupling is made as shown in Fig. 1, or flat to engage the seat faces 17 and 18 when the coupling is made as shown in Fig. 5, and in order to obtain a tight joint, a packing ring 20 is interposed between the seats of the coupled parts.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. A coupling comprising a sleeve having a smooth internal surface at one end and provided with an annular external shoulder at the opposite end, there being a seat on the end of the sleeve adjacent the shoulder, a ring composed of sections fitted around the sleeve against the shoulder thereof, said ring having a shoulder at one end projecting outwardly beyond the sleeve and having a flange at the opposite end arranged with its end face flush with the seat of the sleeve to form a continuation thereof, a pipe soldered in the smooth portion of the bore of the sleeve, a nut internally threaded and having an internal shoulder bearing against the shoulder of the ring, a packing ring covering the seat of the sleeve and end face of the flange on the ring, and an externally threaded pipe on which the nut screws for clamping the parts together.

2. A coupling comprising a sleeve having an annular groove forming spaced shoulders and having a seat formed on the end of the sleeve adjacent the groove, a ring fitted in the groove and engaging the shoulders thereof, said ring being made in sections and of such cross-section as to extend out of the groove to form an annular shoulder outstanding from the sleeve, said ring having a flange arranged with its end face flush with the seat on the sleeve, means for connecting the sections of the ring detachably together for preventing lateral displacement from the groove of the sleeve in assembling the parts of the coupling, a nut surrounding the sleeve and having an internal shoulder bearing on the shoulder of the ring, a packing resting on the seat and end face of the flange on the ring, and a pipe threaded in the nut and engaging the packing.

3. A coupling comprising a thimble having a terminal seat and an annular groove located inwardly from the seat to provide spaced shoulders, a ring composed of sections assembled in the groove and fitted between the shoulders thereof and having an external groove, a flange on one end of the ring having an outer face disposed flush with the said seat to form a continuation thereof, the opposite end face of the ring being recessed to form an extension and an annular shoulder outstanding from the circumference of the thimble, a spring member seated in the groove of the ring for holding the parts thereof together and exerting an inward tension, a pin on each ring section engaging in a socket in the other ring section, a coupling nut fitting around the thimble and having an internal shoulder engaging the shoulder of the ring, and an internal thread on the nut.

In testimony, that I claim the foregoing as my own, I have hereto affixed my signature in the presence of two witnesses.

ERNEST AUGUST KOSCHINSKI.

Witnesses:
GEORGE W. ZINK,
WM. F. COLE.